United States Patent
Chou et al.

(10) Patent No.: US 9,566,748 B2
(45) Date of Patent: Feb. 14, 2017

(54) FRP COMPOSITE WRAPPED GROOVED-WALL LINING TUBULAR STRUCTURE, AND METHOD OF MANUFACTURING

(71) Applicant: NATIONAL APPLIED RESEARCH LABORATORIES, Taipei (TW)

(72) Inventors: Chung-Che Chou, Taipei (TW); Chung-Sheng Lee, Taipei (TW); Hao-Hsiang Tan, Taipei (TW); Kai-Yi Wu, Taipei (TW)

(73) Assignee: National Applied Research Laboratories, Taipei (TW)

( * ) Notice: Subject to any disclaimer, the term of this patent is extended or adjusted under 35 U.S.C. 154(b) by 267 days.

(21) Appl. No.: 14/272,375

(22) Filed: May 7, 2014

(65) Prior Publication Data

US 2015/0159387 A1 Jun. 11, 2015

(30) Foreign Application Priority Data

Dec. 9, 2013 (TW) .............................. 102145218 A
Mar. 13, 2014 (TW) .............................. 103109101 A

(51) Int. Cl.
*E04B 1/00* (2006.01)
*B29C 70/86* (2006.01)
(Continued)

(52) U.S. Cl.
CPC ............... *B29C 70/86* (2013.01); *B29C 70/32* (2013.01); *E04C 3/34* (2013.01); *E04C 3/36* (2013.01);
(Continued)

(58) Field of Classification Search
CPC .......... B29C 70/86; B29C 70/32; B29C 53/58; B29L 2023/003; B29L 2023/22; E04G 13/021; E04G 23/0218; E04C 3/34; E04C 3/36; E04C 5/07; E04C 3/30; E02D 5/64
(Continued)

(56) References Cited

U.S. PATENT DOCUMENTS 3,798,867 A * 3/1974 Starling .................... E02D 5/64
                                                          52/742.14
4,887,789 A * 12/1989 Harris ..................... E04G 13/02
                                                          249/134
(Continued)

FOREIGN PATENT DOCUMENTS

CN            2825277       10/2006
CN       103057174 A     4/2013
(Continued)

OTHER PUBLICATIONS

Search Report from Chinese Patent Application No. 2014100665414 dated Mar. 15, 2016, and its English translation.

*Primary Examiner* — Gwendolyn Baxter
(74) *Attorney, Agent, or Firm* — Ladas & Parry, LLP

(57) ABSTRACT

A forming tube for forming and reinforcing a concrete column includes a tubular lining and a fiber-reinforced composite shell. The tubular lining is made from a first material, and has inner and outer tubular surfaces. The inner tubular surface has a plurality of ridge units displaced from one another in a direction of an axis. Each ridge unit has a plurality of ridges displaced from one another in a circumferential direction. The fiber-reinforced composite shell is made from a second material different from the first material, and is configured to enclose the outer tubular surface. The fiber-reinforced composite shell is formed by winding a prepreg filament on the outer tubular surface, followed by curing the prepreg filament.

18 Claims, 12 Drawing Sheets

(51) Int. Cl.
  *B29C 70/32* (2006.01)
  *E04C 3/34* (2006.01)
  *E04C 3/36* (2006.01)
  *E04C 5/07* (2006.01)
  *B29L 23/00* (2006.01)
  *B29C 53/58* (2006.01)
  *E04G 13/02* (2006.01)

(52) U.S. Cl.
  CPC .............. *E04C 5/07* (2013.01); *B29C 53/58* (2013.01); *B29L 2023/003* (2013.01); *B29L 2023/22* (2013.01); *E04G 13/021* (2013.01)

(58) Field of Classification Search
  USPC .......... 52/834, 742.14, 837; 249/48, 51, 188
  See application file for complete search history.

(56) References Cited

U.S. PATENT DOCUMENTS

| | | | |
|---|---|---|---|
| 5,043,033 A * | 8/1991 | Fyfe | B29C 70/56 156/161 |
| 6,189,286 B1 | 2/2001 | Seible | 52/721.4 |
| 6,467,749 B1 * | 10/2002 | van de Camp | B28B 7/342 229/4.5 |
| 2004/0096604 A1 | 5/2004 | van de Camp | |

FOREIGN PATENT DOCUMENTS

| | | |
|---|---|---|
| EP | 1419985 | 5/2004 |
| JP | 5-177722 A | 7/1993 |
| TW | 200418634 A | 10/2004 |

* cited by examiner

FRP COMPOSITE WRAPPED GROOVED-WALL LINING TUBULAR STRUCTURE, AND METHOD OF MANUFACTURING

CROSS-REFERENCE TO RELATED APPLICATION

This application claims priority from Taiwanese application no. 102145218, filed on Dec. 9, 2013, and Taiwanese application no. 103109101, filed on Mar. 13, 2014, the disclosures of which are incorporated in their entireties herein by reference.

BACKGROUND OF THE INVENTION

1. Field of the Invention

This invention relates to a FRP (Fiber-Reinforced Polymer) composite wrapped grooved-wall lining tubular structure and method of manufacturing.

2. Description of the Related Art

A steel-reinforced concrete structure is commonly used in a building structure. Because steel material is heavy and liable to corrode, many alternative reinforcement materials have been proposed. For example, a composite structural member has been disclosed in U.S. Pat. No. 6,189,286 B1. The composite structural member includes a FRP shell and a concrete core. Ribs are formed on an inner surface of the FRP shell and may be concentric or helical continuing from one end of the fiber-reinforced shell to a desired depth so as to provide a mechanical bond interlock between the fiber-reinforced shell and the concrete core. The FRP shell is made by winding filaments which are pre-coated with resin or polymer binders (i.e., prepreg filaments) on a rotating mandrel, and curing the filaments. After curing, the FRP shell is removed from the rotating mandrel. In order to form the ribs on the inner surface of the FRP shell, the mandrel is formed with a pattern corresponding to the ribs. However, it is difficult to remove the FRP shell from the mandrel due to the presence of the ribs.

In addition, as the filaments are wound about a rotating axis of the mandrel, rather than along a direction of the rotating axis, the composite structural member is relatively weak along the direction of the rotating axis.

SUMMARY OF THE INVENTION

Therefore, an object of the present invention is to provide a FRP composite wrapped grooved-wall lining tubular structure (a forming tube), which can be used as a structural member by itself or can be used for forming and reinforcing a concrete column.

Another object is to provide a method of manufacturing a FRP composite wrapped grooved-wall lining tubular structure (a forming tube), in which the tubular structure can be easily removed from a mandrel.

According to a first aspect of this invention, a forming tube for forming and reinforcing a concrete column includes:

a tubular lining made from a first material, configured to extend along an axis to terminate at first and second peripheral ends, and having an inner tubular surface including a plurality of ridge units displaced from one another in a direction of the axis, each of the ridge units including a plurality of ridges displaced from one another in a circumferential direction and an outer tubular surface opposite to the inner tubular surface in radial directions; and a fiber-reinforced composite shell which is made from a second material different from the first material, and which is configured to enclose the outer tubular surface, the fiber-reinforced composite shell being formed by winding a prepreg filament on the outer tubular surface, followed by curing the prepreg filament.

According to a second aspect of this invention, a method of manufacturing a forming tube for forming and reinforcing a concrete column includes the steps of:

(a) providing a tubular lining that is made from a first material, that extends along an axis to terminate at first and second peripheral ends, and that has an inner tubular surface including a plurality of ridge units displaced from one another in a direction of the axis, each of the ridge units including a plurality of ridges displaced from one another in a circumferential direction, and an outer tubular surface opposite to the inner tubular surface in radial directions;

(b) winding a prepreg filament on the outer tubular surface to enclose the outer tubular surface, the prepreg filament being made from a second material different from the first material; and (c) curing the prepreg filament so as to obtain a fiber-reinforced composite shell.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
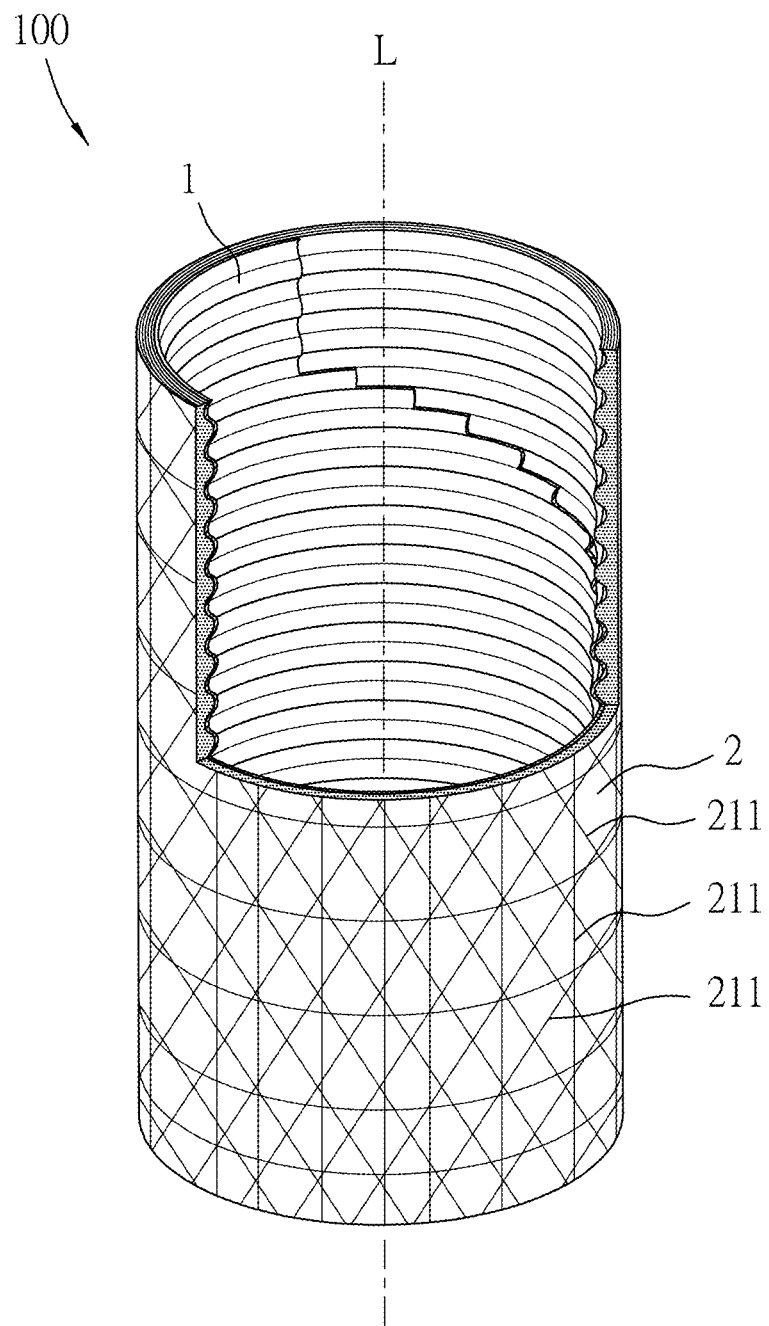
FIG. 1 is a schematic perspective, partial cut-away view of a forming tube according to a first preferred embodiment of this invention.

Before the present invention is described in greater detail, it should be noted herein that same reference numerals are used to denote like elements throughout the specification.

Figure 2:
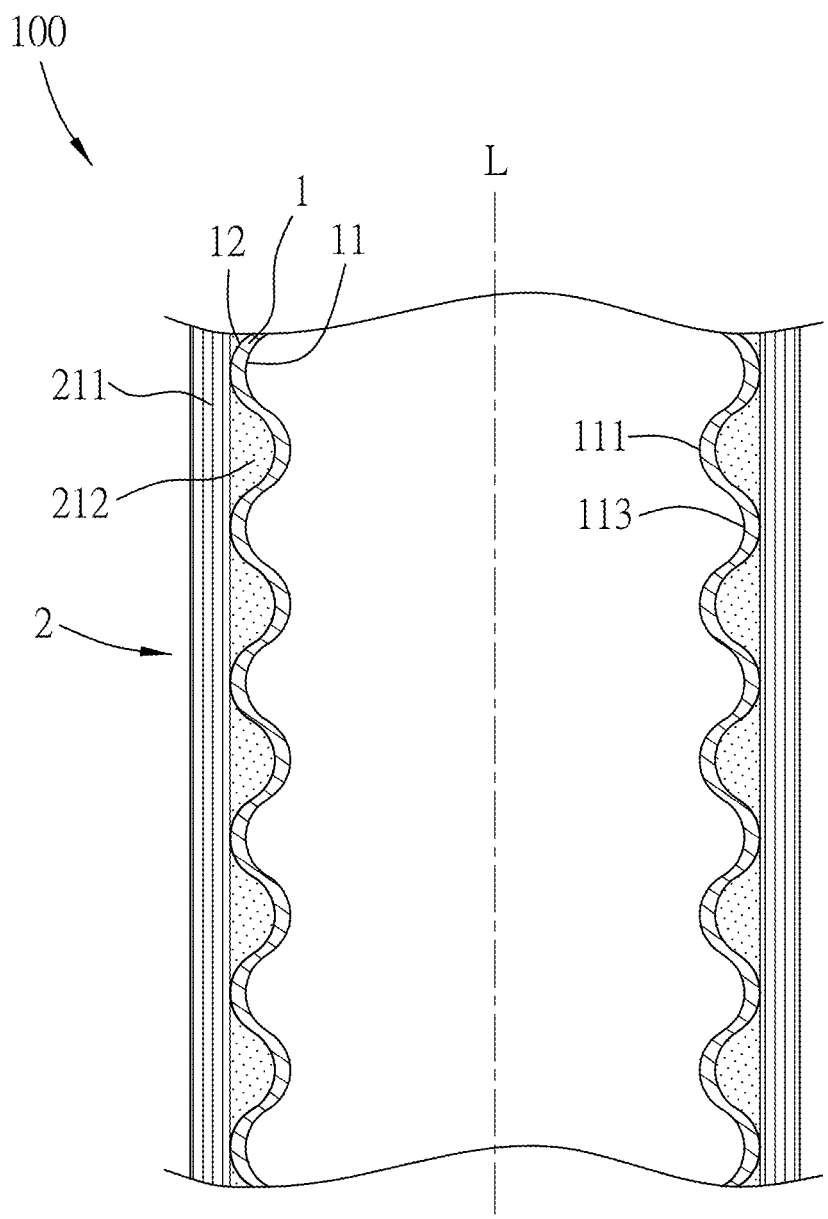
FIG. 2 is a fragmentary cross-sectional view of the forming tube.
Figure 3:
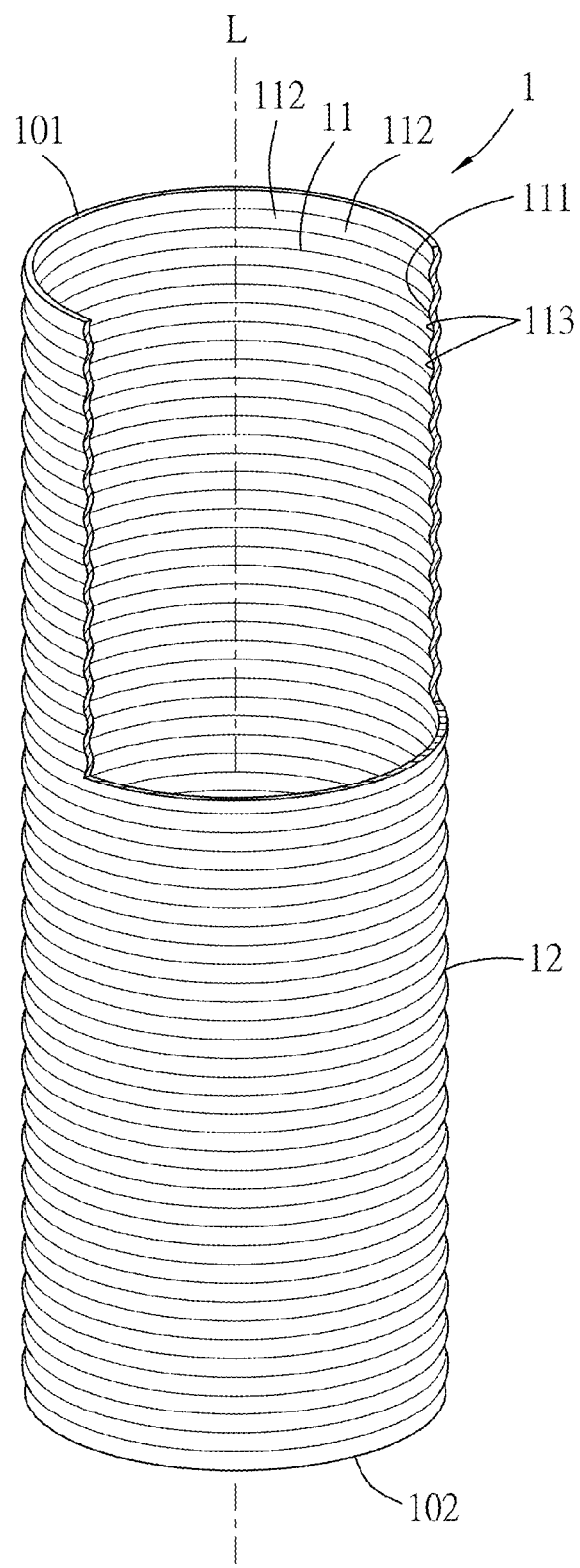
FIG. 3 is a perspective, partial cut-away view of a tubular lining of the forming tube.

Referring to FIGS. 1 to 3, a forming tube 100 for forming and reinforcing a concrete column (not shown) according to a first preferred embodiment of this invention is shown to include a tubular lining 1 and a fiber-reinforced composite shell 2. In this preferred embodiment, the forming tube 100 is a FRP composite wrapped grooved-wall lining tubular structure.

The tubular lining 1 is made from a first material, and is configured to extend along an axis (L) to terminate at first and second peripheral ends 101, 102. The tubular lining 1 has inner and outer tubular surfaces 11, 12 opposite to each other in radial directions. The inner tubular surface 11 includes a plurality of ridge units 111 which are displaced from one another in a direction of the axis (L). Each of the ridge units 111 includes a plurality of ridges 112 which are displaced from one another in a circumferential direction.

In this embodiment, the ridges 112 of each of the ridge units 111 are configured to extend in the circumferential direction and in line with each other such that each of the ridge units 111 has an annular shape, and such that a plurality of grooves 113 are each defined by two adjacent ones of the ridge units 111. The grooves 113 are configured to render the inner tubular surface 11 corrugated. The outer tubular surface 12 is also corrugated.

Preferably, the first material is a metal material (such as iron, steel, galvanized steel, aluminum alloy, etc.) or a plastic material.

The fiber-reinforced composite shell 2 is made from a second material different from the first material. The fiber-reinforced composite shell 2 is configured to enclose the outer tubular surface 12, and is formed by winding a prepreg filament 210 on the outer tubular surface 12 and curing the prepreg filament 210 (see FIG. 11), to be described in detail hereinbelow. The cured prepreg filament 210 includes a plurality of filament segments 211, as shown in FIG. 1, and constitutes the second material.

In this context, the term "prepreg filament" means a fiber filament pre-impregnated with a thermosetting resin material. The fiber filament may be made from carbon fibers, glass fibers, or other suitable fiber materials.

Figure 4:
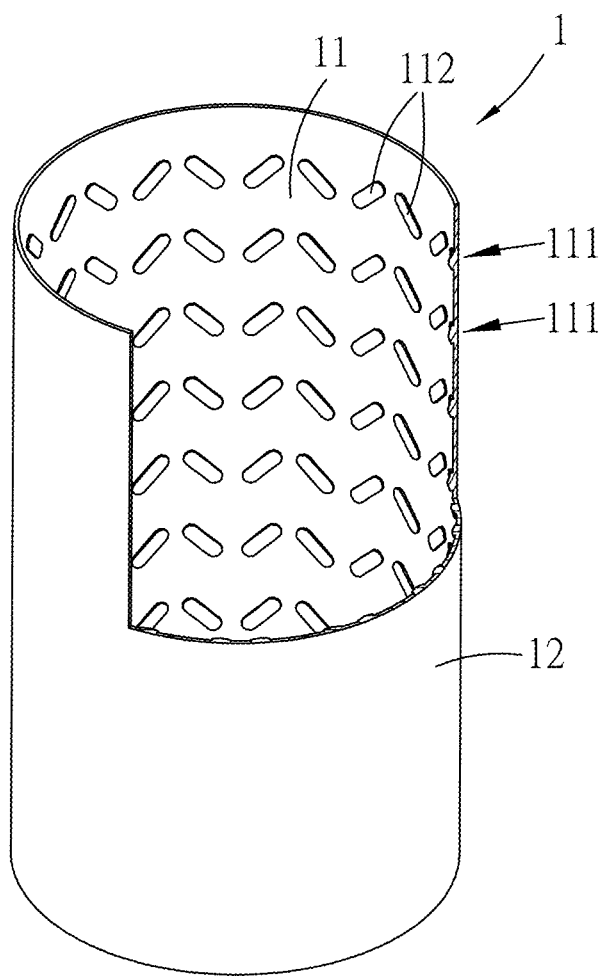
FIG. 4 is a perspective, partial cut-away view of a tubular lining of a forming tube according to a second preferred embodiment of this invention.

FIG. 4 illustrates a tubular lining 1 according to a second preferred embodiment of this invention. The tubular lining 1 of this embodiment is similar to that of the first preferred embodiment, except that the outer tubular surface 12 is not corrugated and that the ridges 112 of each of the ridge units 111 are spaced apart from one another in the circumferential direction.

Figure 5:
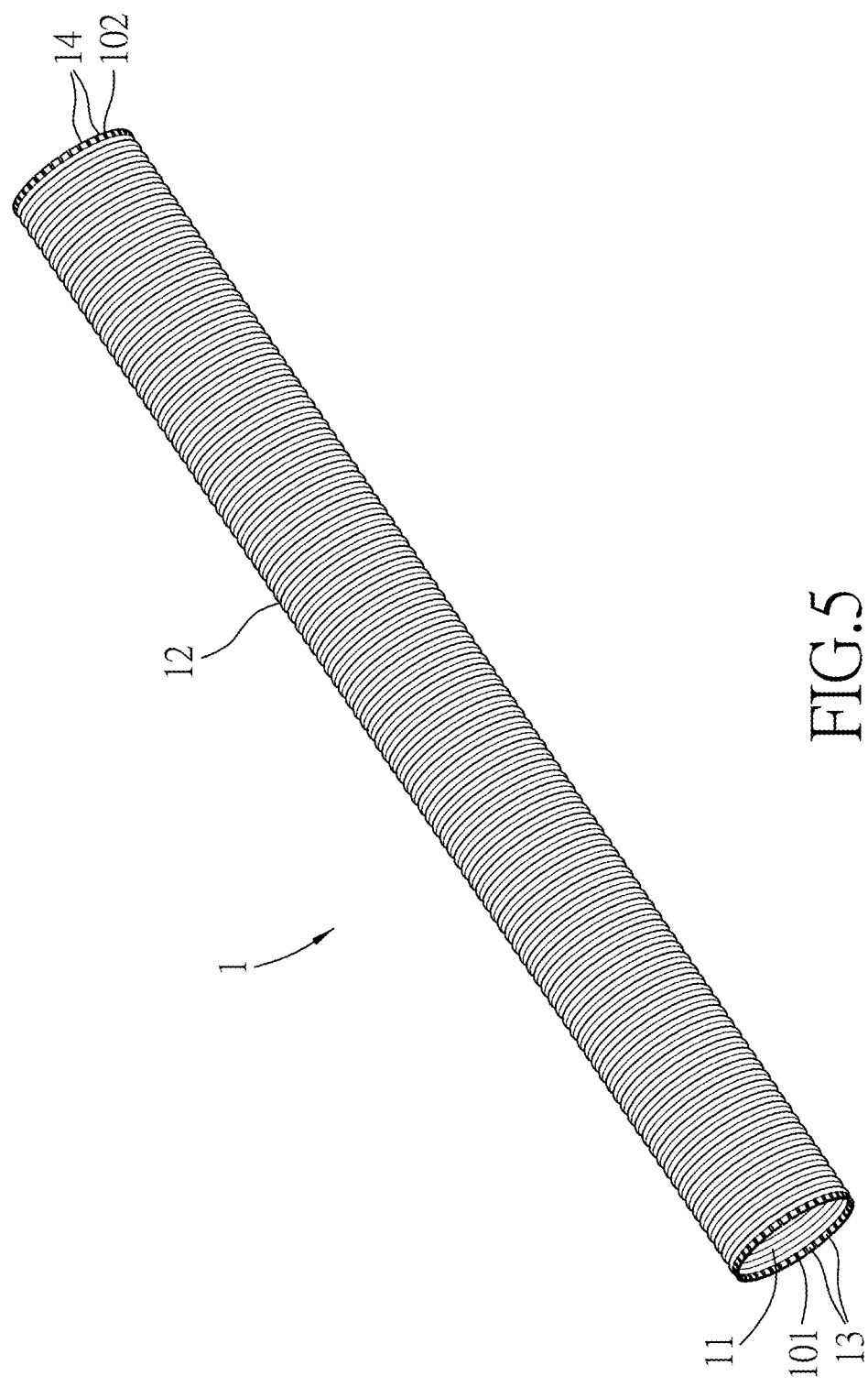
FIG. 5 is a perspective view of a tubular lining of a forming tube according to a third preferred embodiment of this invention.
Figure 6:
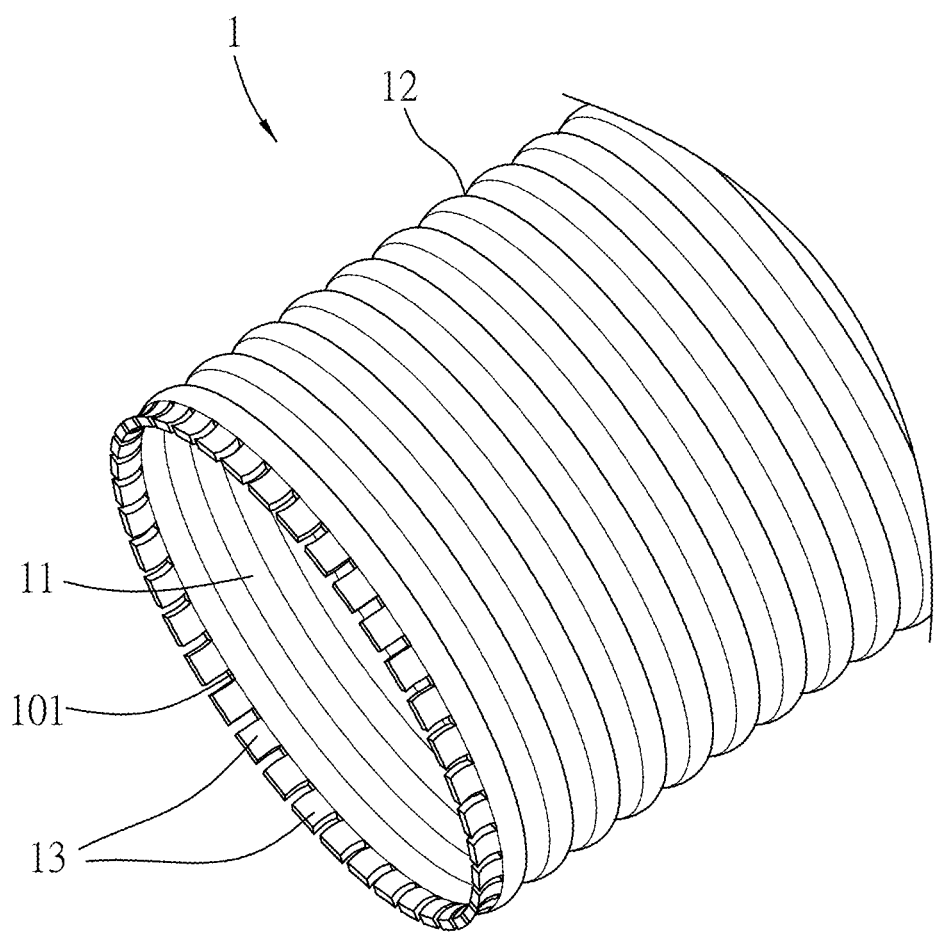
FIG. 6 is a fragmentary enlarged view of FIG. 5.

FIGS. 5 and 6 illustrate a tubular lining 1 according to a third preferred embodiment of this invention. The tubular lining 1 of this embodiment is similar to that of the first preferred embodiment, except that the first peripheral end 101 has a plurality of first direction reversing guides 13 displaced from one another in the circumferential direction, and the second peripheral end 102 has a plurality of second direction reversing guides 14 displaced from one another in the circumferential direction to permit the prepreg filament 210 to be wound alternately and sequentially on the first and second direction reversing guides 13, 14 such that, during formation of the fiber-reinforced composite shell 2, the filament segments 211 extend in the direction of the axis (L) (see also FIG. 12). In this embodiment, each of the first and second direction reversing guides 13, 14 extends in the direction of the axis (L).

Figure 7:
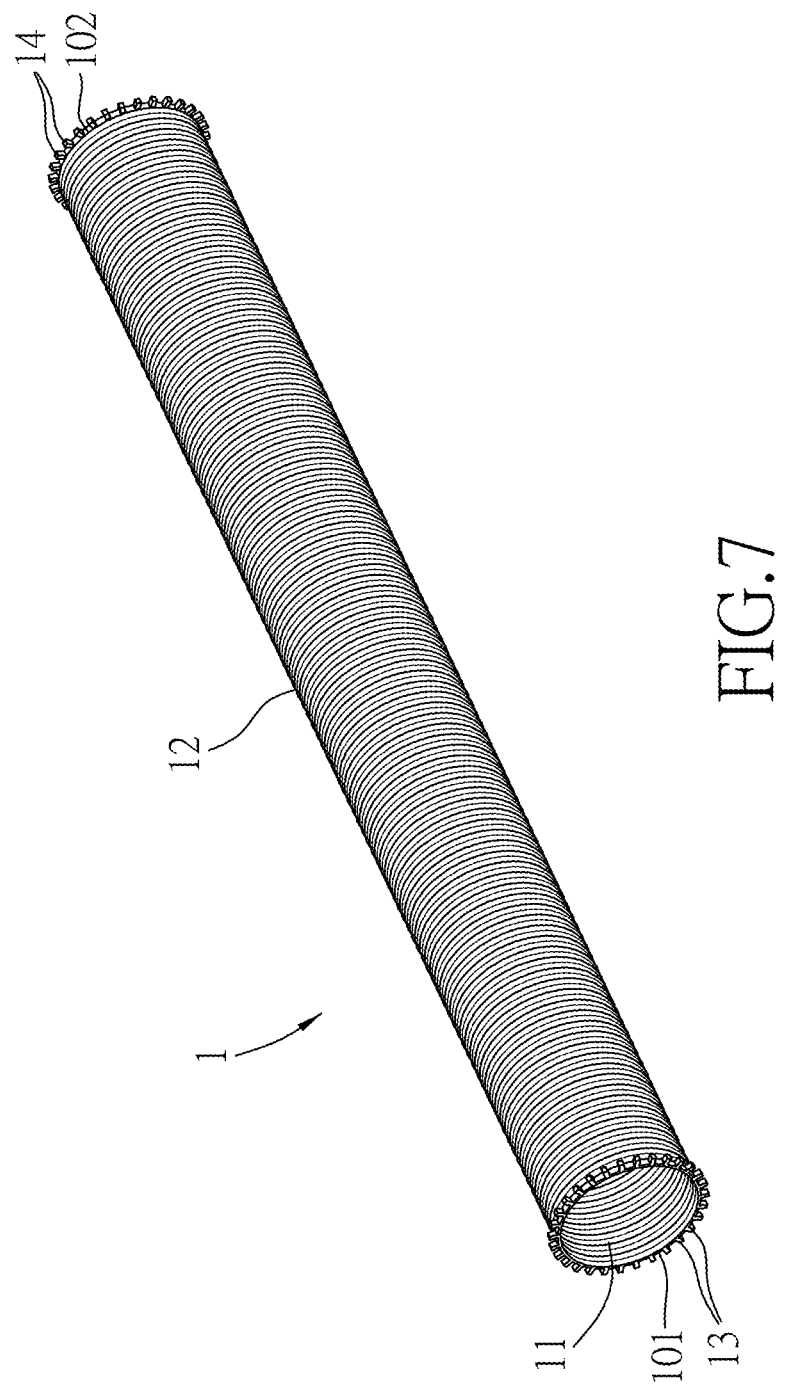
FIG. 7 is a perspective view of a tubular lining of a forming tube according to a fourth preferred embodiment of this invention.
Figure 8:
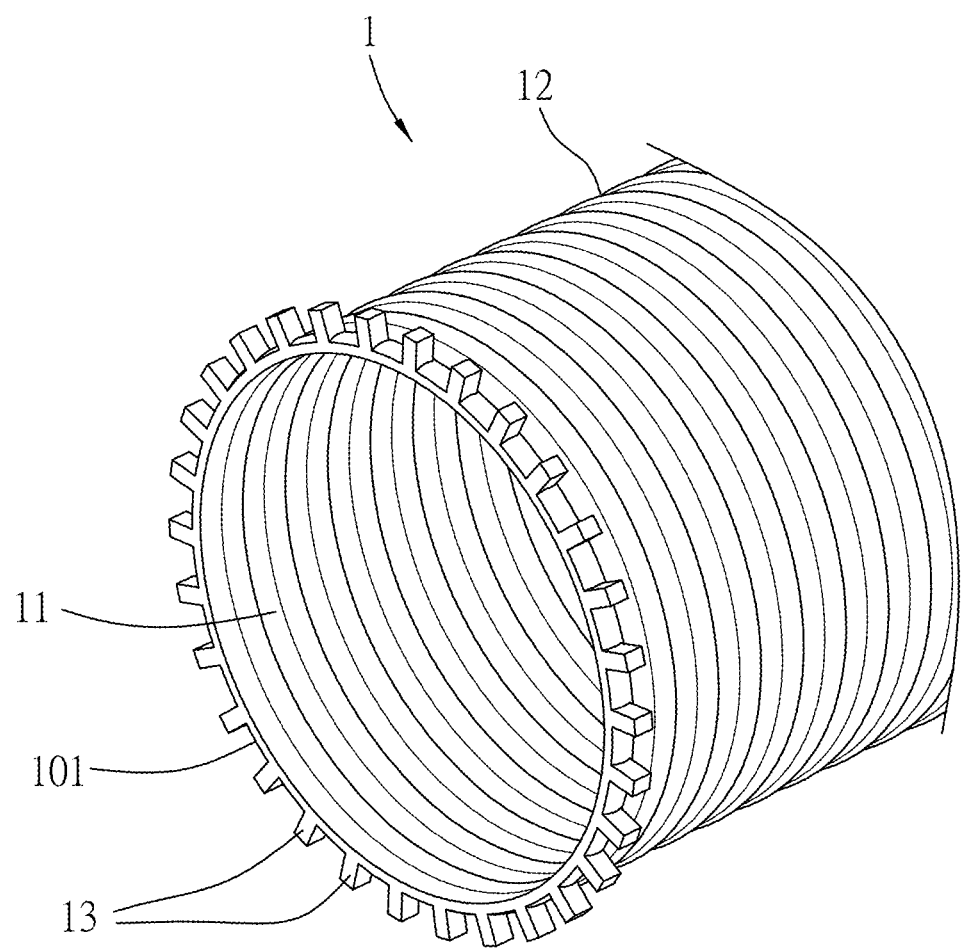
FIG. 8 is a fragmentary enlarged view of FIG. 7.

FIGS. 7 and 8 illustrate a tubular lining 1 according to a fourth preferred embodiment of this invention. The tubular lining 1 of this embodiment is similar to that of the third preferred embodiment, except that each of the first and second direction reversing guides 13, 14 extends in a radial direction.

Figure 9:
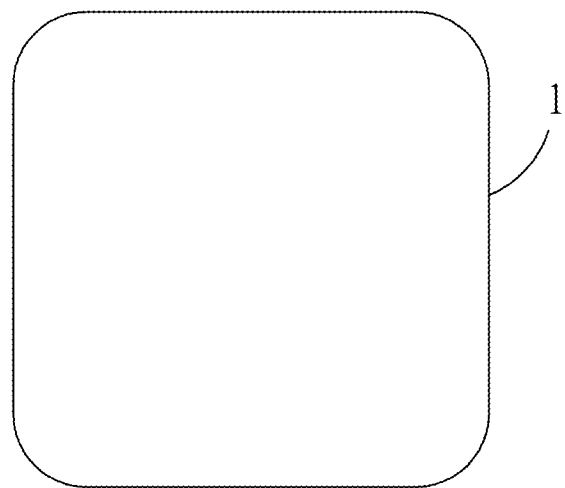
FIG. 9 is a schematic view illustrating a cross-sectional shape of a tubular lining in a modified embodiment.
Figure 10:
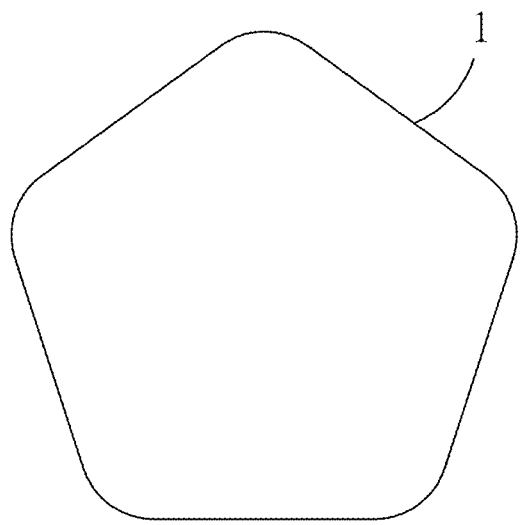
FIG. 10 is a schematic view illustrating a cross-sectional shape of a tubular lining in another modified embodiment.

Although the tubular lining 1 has a circular cross-section in the above-described embodiments, in other modified embodiments, as shown in FIGS. 9 and 10, the tubular lining 1 may have a polygonal cross-section.

A method of manufacturing the forming tube 100 according to a preferred embodiment of the present invention will be exemplified below using the tubular lining 1 shown in FIGS. 5 and 6.

Figure 11:
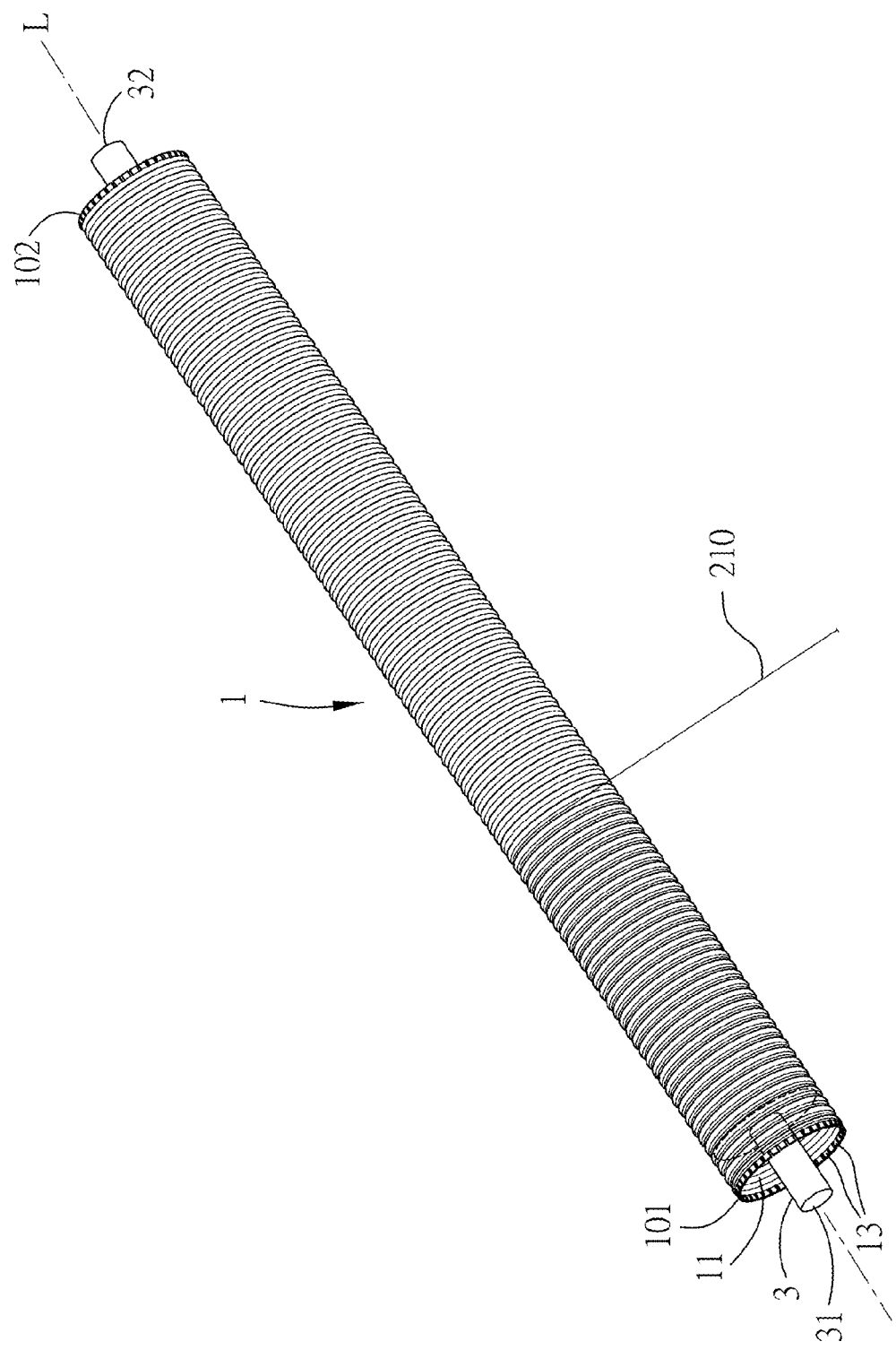
FIGS. 11 and 12 illustrate winding of a prepreg filament on an outer surface of a tubular lining according to this invention.
Figure 12:
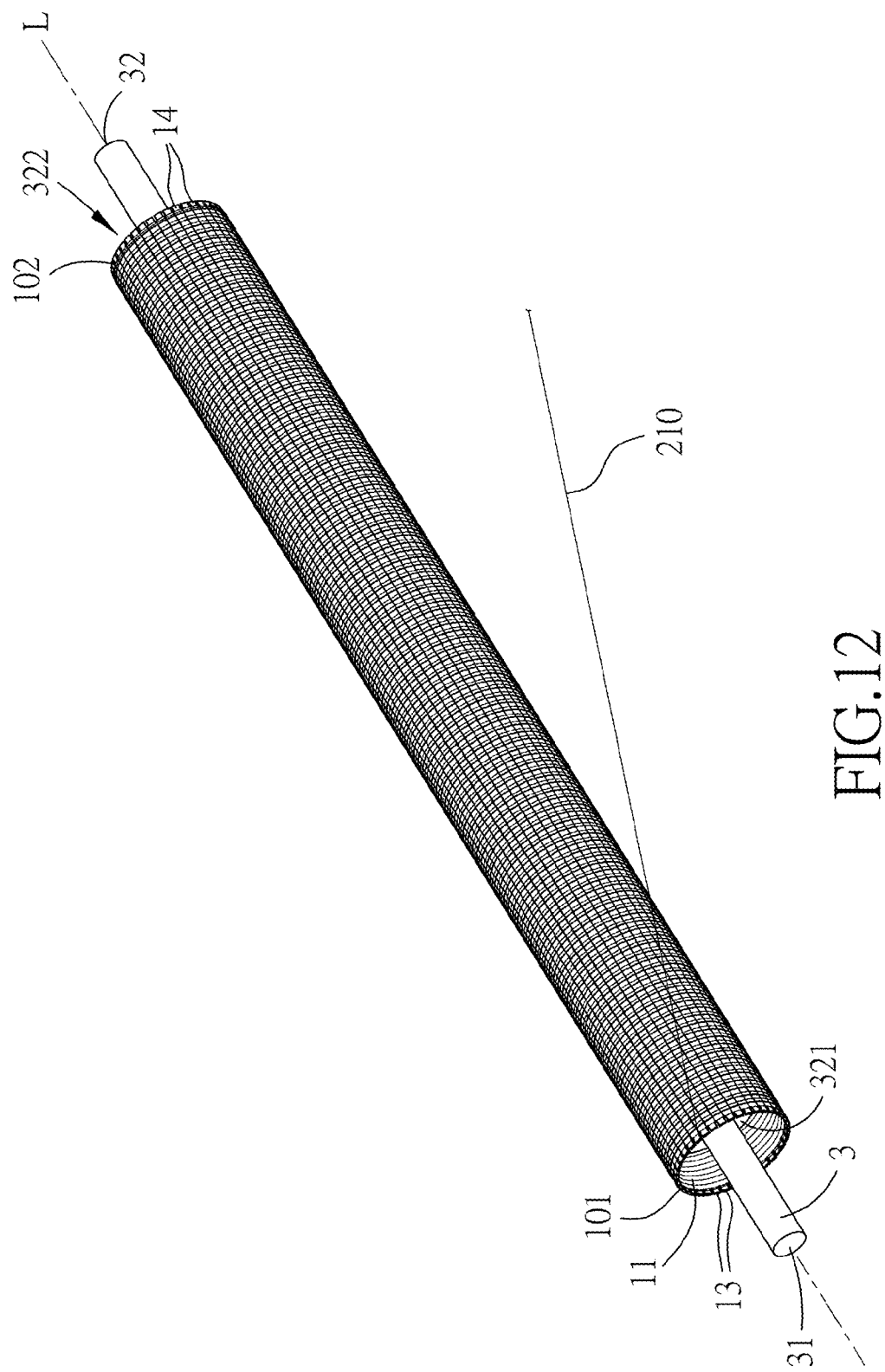

The method includes the steps of: (a) providing the tubular lining 1 of FIGS. 5 and 6, (b) winding the prepreg filament 210 on the outer tubular surface 12 to enclose the outer tubular surface 12 (see FIGS. 11 and 12), and (c) curing the prepreg filament 210 to obtain the fiber-reinforced composite shell 2. In step (c), the prepreg filament 210 is cured to have the filament segments 211 extending in a cured resin matrix 212 (see FIG. 2). The cured resin matrix 212 is in mechanical engagement with the corrugated outer tubular surface 12 of the tubular lining 1. Some of the filament segments 211 extend about the axis (L), and some of the filament segments 211 extend in the direction of the axis (L), as shown in FIGS. 1, 11, and 12.

It should be noted that as some of the filament segments 211 extend in the direction of the axis (L), steel strips for reinforcing the concrete column in the direction of the axis (L) can be used in a reduced amount.

Preferably, step (b) includes substeps (b1) to (b4).

In substep (b1), a mandrel 3 is provided. The mandrel 3 extends lengthwise and terminates at first and second mandrel ends 31, 32.

In substep (b1), the tubular lining 1 is sleeved on the mandrel 3 such that the first peripheral end 101 of the tubular lining 1 and the first mandrel end 31 cooperatively define a first surrounding gap 321 therebetween, and the second peripheral end 102 of the tubular lining 1 and the second mandrel end 32 cooperatively define a second surrounding gap 322 therebetween.

Figure 13:
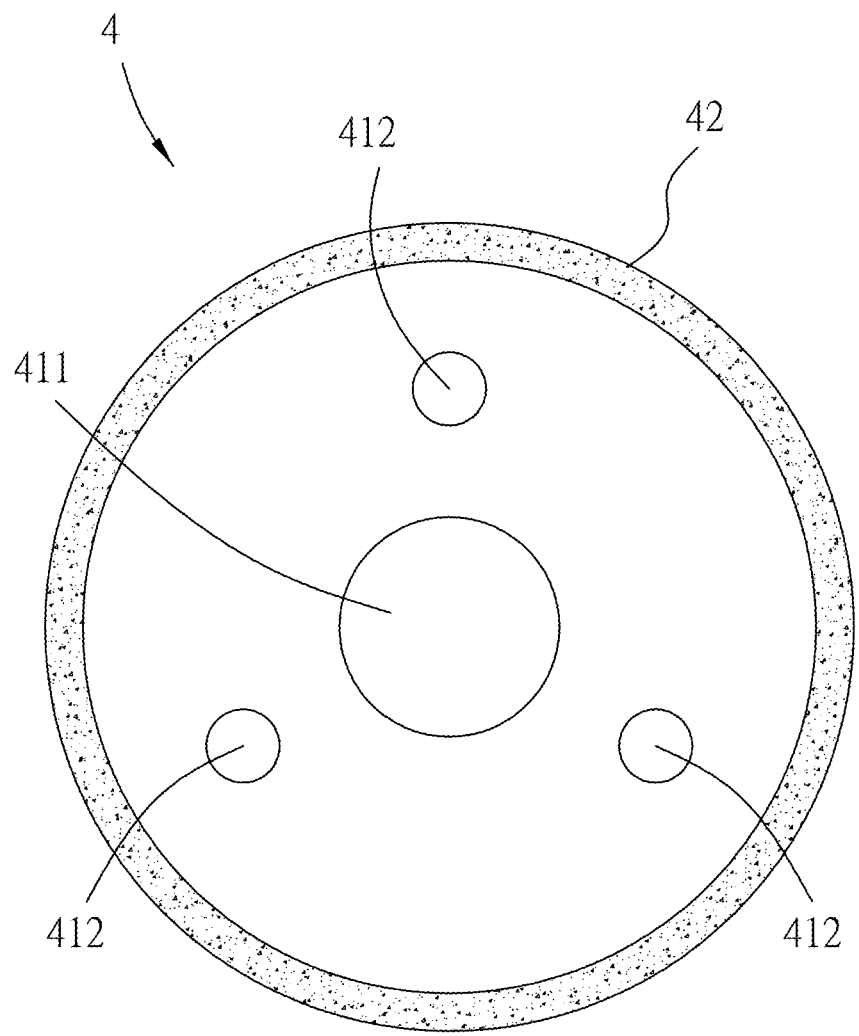
FIG. 13 is a schematic view of a jig used for manufacturing the forming tube of this invention.

In substep (b3), first and second jigs 4 each having an outer friction surface 42 are provided (only one jig is shown in FIG. 13). The first and second jigs 4 are sleevably mounted on the mandrel 31 and respectively fitted in the first and second surrounding gaps 321, 322, with the outer friction surfaces 42 in friction engagement with the inner tubular surface 11 at the first and second peripheral ends 101, 102, thereby permitting rotation of the tubular lining 1 with the mandrel 3.

With reference to FIG. 13, each of the first and second jigs 4 is formed with a through hole 411 for passage of a corresponding one of the first and second mandrel ends 31, 32 therethrough, and three screw holes 412 for fixing the respective jig 4 to the mandrel 3 by three screws (not shown).

In step (b4), the prepreg filament 210 is fed to the outer tubular surface 12 of the tubular lining 1 such that when the tubular lining 1 is rotated with the mandrel 3, the prepreg filament 210 is wound on the outer tubular surface 12 to enclose the tubular lining 1.

As shown in FIGS. 11 and 12, in this preferred embodiment, the prepreg filament 210 is wound about the axis (L), and is wound alternately and sequentially on the first and second direction reversing guides 13, 14.

After the curing step (step (c)), the first and second jigs 4 are removed from the mandrel 3, and the mandrel 3 can be easily removed from the forming tube 1. Since the mandrel 3 is not in direct contact with the prepreg filament 210 during formation of the fiber-reinforced composite shell 2, the mandrel 3 can be reused.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A forming tube for forming and reinforcing a concrete column, comprising:
   a tubular lining made from a first material, configured to extend along an axis to terminate at first and second peripheral ends, and having
      an inner tubular surface including a plurality of ridge units displaced from one another in a direction of the axis, each of said ridge units including a plurality of ridges displaced from one another in a circumferential direction, and
      an outer tubular surface opposite to said inner tubular surface in radial directions; and
   a fiber-reinforced composite shell which is made from a second material different from said first material, and which is configured to enclose said outer tubular surface, said fiber-reinforced composite shell being formed by winding a prepreg filament on said outer tubular surface, followed by curing the prepreg filament.

2. The forming tube of claim 1, wherein said ridges of each of said ridge units are configured to extend in the circumferential direction and in line with each other such that each of said ridge units has an annular shape, and such that a plurality of grooves are each defined by two adjacent ones of said ridge units, each of said grooves being configured to render said inner tubular surface corrugated.

3. The forming tube of claim 2, wherein said outer tubular surface is corrugated.

4. The forming tube of claim 1, wherein said first peripheral end has a plurality of first direction reversing guides displaced from one another in the circumferential direction, and said second peripheral end has a plurality of second direction reversing guides displaced from one another in the circumferential direction to permit said prepreg filament to be wound alternately and sequentially on said first and second direction reversing guides so as to have a plurality of filament segments extending in the direction of the axis.

5. The forming tube of claim 1, wherein said prepreg filament is wound about the axis.

6. The forming tube of claim 1, wherein said first material is a metal material or a plastic material.

7. The forming tube of claim 1, wherein the fiber-reinforced composite shell is a seamless fiber-reinforced composite shell.

8. A method of manufacturing a forming tube for forming and reinforcing a concrete column, comprising the steps of:
   (a) providing a tubular lining that is made from a first material, that extends along an axis to terminate at first and second peripheral ends, and that has
      an inner tubular surface including a plurality of ridge units displaced from one another in a direction of the axis, each of the ridge units including a plurality of ridges displaced from one another in a circumferential direction, and
      an outer tubular surface opposite to the inner tubular surface in radial directions;
   (b) winding a prepreg filament on the outer tubular surface to enclose the outer tubular surface, the prepreg filament being made from a second material different from the first material; and
   (c) curing the prepreg filament so as to obtain a fiber-reinforced composite shell.

9. The method of claim 8, wherein step (b) includes the sub steps of:
   (b1) providing a mandrel which extends lengthwise to terminate at first and second mandrel ends;
   (b2) sleeving the tubular lining on the mandrel such that the first peripheral end and the first mandrel end cooperatively define a first surrounding gap therebetween, and the second peripheral end and the second mandrel end cooperatively define a second surrounding gap therebetween;
   (b3) providing a jig which has an outer friction surface and sleevably mounting the jig on the mandrel so as to permit the jig to be fitted in one of the first and second surrounding gaps, with the outer friction surface in friction engagement with the inner tubular surface to thereby permit rotation of the tubular lining with the mandrel; and
   (b4) feeding the prepreg filament to the outer tubular surface of the tubular lining such that when the tubular lining is rotated with the mandrel, the prepreg filament is wound on the outer tubular surface to enclose the tubular lining.

10. The method of claim 9, wherein the prepreg filament is wound about the axis.

11. The method of claim 8, wherein the first peripheral end has a plurality of first direction reversing guides displaced from one another in the circumferential direction, the second peripheral end having a plurality of second direction reversing guides displaced from one another in the circumferential direction to permit the prepreg filament to be wound alternately and sequentially on the first and second direction reversing guides so as to have a plurality of filament segments extending in the direction of the axis.

12. The method of claim 8, wherein the first material is a metal material or a plastic material.

13. The method of claim 8, wherein the ridges of each of the ridge units are configured to extend in the circumferential direction and in line with each other such that each of the ridge units has an annular shape, and such that a plurality of grooves are each defined by two adjacent ones of the ridge units, each of the grooves being configured to render the inner tubular surface corrugated.

14. The method of claim 13, wherein the outer tubular surface is corrugated.

15. The method of claim 8, wherein the prepreg filament is wound around the outer tubular surface to enclose the outer tubular surface.

16. The method of claim 8, wherein the prepreg filament is wound on the outer tubular surface to form a seamless enclosure of the outer tubular surface, and the prepreg filament is cured so as to obtain a seamless fiber-reinforced composite shell.

17. The method of claim 8, wherein the prepreg filament is wound on the outer tubular surface to form a tubular-shaped enclosure of the outer tubular surface, and the prepreg filament is cured so as to obtain a tubular-shaped fiber-reinforced composite shell.

18. A forming tube having a tubular shape for forming and reinforcing a concrete column, comprising:
   a tubular lining made from a first material, configured to extend along an axis to terminate at first and second peripheral ends, and having:

an inner tubular surface including a plurality of ridge units displaced from one another in a direction of the axis, each of said ridge units including a plurality of ridges displaced from one another in a circumferential direction, and an outer tubular surface opposite to said inner tubular surface in radial directions; and a fiber-reinforced composite shell which is made from a second material different from said first material, and which is configured to enclose said outer tubular surface, wherein the tubular shape is formed by winding a prepreg filament on said outer tubular surface, followed by curing the prepreg filament.

* * * * *